(12) United States Patent
Kurahashi et al.

(10) Patent No.: US 6,674,203 B2
(45) Date of Patent: Jan. 6, 2004

(54) VEHICLE ROTARY ELECTRIC MACHINE

(75) Inventors: Takaaki Kurahashi, Anjo (JP); Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/126,671

(22) Filed: Apr. 22, 2002

(65) Prior Publication Data

US 2002/0153799 A1 Oct. 24, 2002

(30) Foreign Application Priority Data

Apr. 24, 2001 (JP) ..................... 2001-125413

(51) Int. Cl.[7] .............................................. H02K 21/12
(52) U.S. Cl. ......................... 310/154.41; 310/154.41; 310/154.51; 310/156.62
(58) Field of Search ................. 310/154.41, 156.51, 310/201, 202, 203, 215, 216

(56) References Cited

U.S. PATENT DOCUMENTS 5,854,525 A * 12/1998 Pommelet .................. 310/214
5,965,965 A * 10/1999 Umeda ........................ 310/52

FOREIGN PATENT DOCUMENTS

| CH | 0951132a2 | * 10/1999 | ......... H02K/15/12 |
| JP | 56-17856 | 7/1979 | |

* cited by examiner

*Primary Examiner*—Nestor Ramirez
*Assistant Examiner*—Iraj A. Mohandesi
(74) *Attorney, Agent, or Firm*—Oliff & Berridge, PLC

(57) ABSTRACT

In a stator of a vehicle rotary electric machine, a stator winding includes U-shaped conductor segments having a pair of straight portions disposed in a pair of slots spaced apart at a fixed pitch in layers. Each U-shaped conductor segment has a generally rectangular cross section and a width to fit the slot. The U-shaped conductor segments are formed of large size U-shaped conductor segments and small size U-shaped conductor segments, and each of the large size U-shaped conductor segments has a pair of straight portions disposed at radially opposite ends of the layers and have corners whose radius is larger than corners of the small size U-shaped conductor segments. Therefore, it is easy to form rounded corners at portions of the stator winding thereby to provide uniform insulation coating at surfaces of the stator winding exposed to foreign particles.

20 Claims, 4 Drawing Sheets

FIG. 4
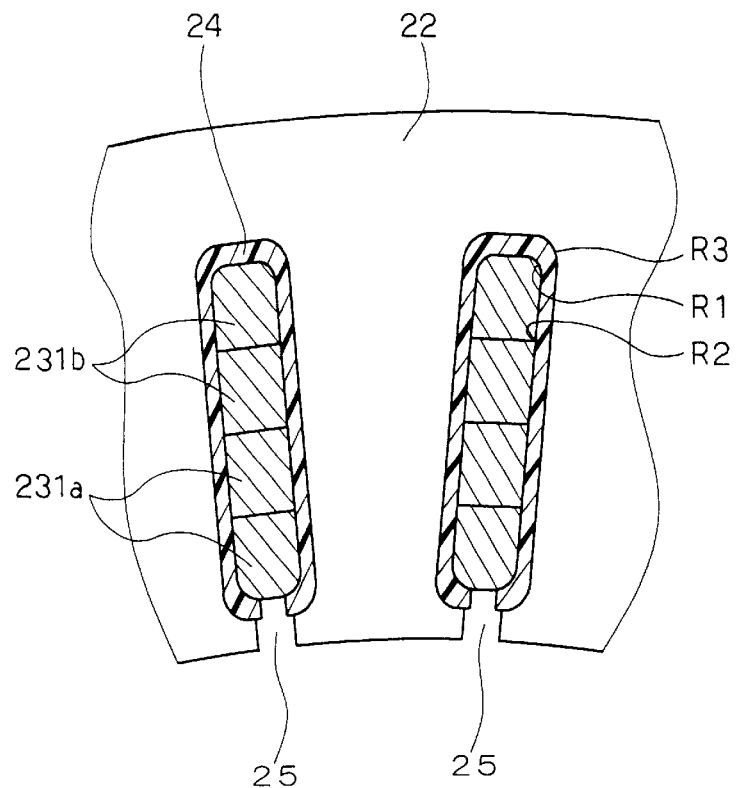
FIG. 5A
FIG. 5B
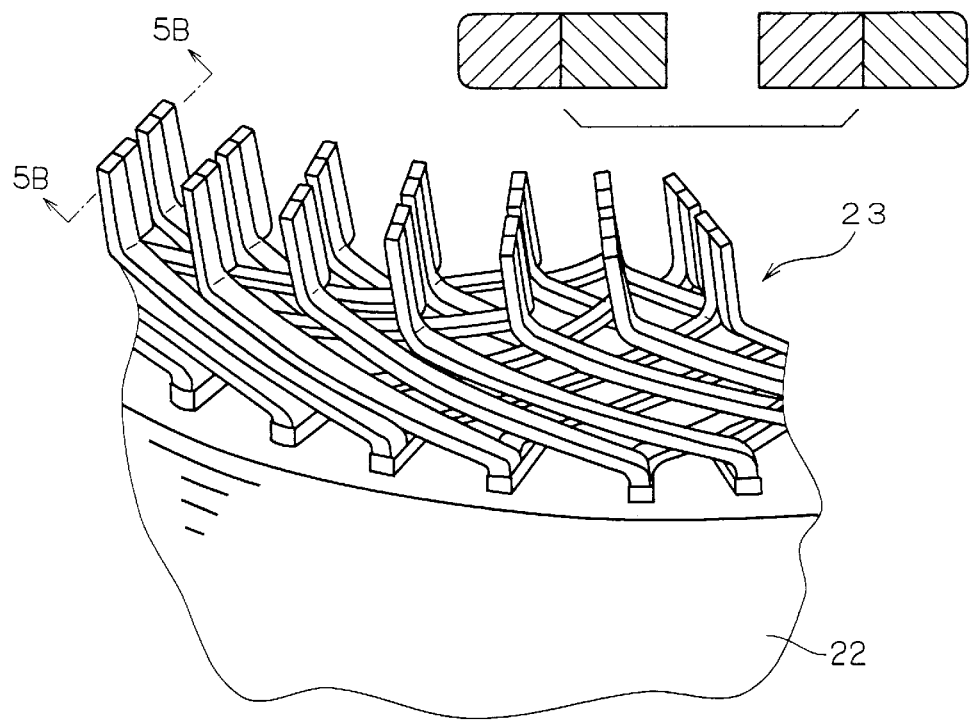

VEHICLE ROTARY ELECTRIC MACHINE

CROSS REFERENCE TO RELATED APPLICATION

The present application is based on and claims priority from Japanese Patent Application 2001-125413, filed Apr. 24, 2001, the contents of which are incorporated herein by reference.

BACKGROUND OF THE INVENTION

1. Field of the Invention

The present invention relates to a rotary electric machine to be mounted in a passenger car or a truck.

2. Description of the Related Art

The engine compartment of a vehicle has become narrower due to a tendency of vehicle's nose being slanted in order to reduce vehicle running resistance. Therefore, there is a small space for accessories and parts such as a vehicle AC generator in the engine compartment.

In addition, the idling speed of the engine is lowered to improve fuel consumption, while various devices such as devices for safety are added. Therefore, a demand for a compact and powerful vehicle AC generator that can generate large power at a low speed range has been growing.

In order to increase the output power of the AC generator, a flat or rectangular copper wire is used for the stator winding of the AC generator, so that the ratio of the conductor cross-section to the cross-section of the slot, or the space factor, can be increased.

However, the flat copper wire has sharp corners, where insulation coating may become uneven and very thin. Such insulation coating may be accidentally broken by foreign particles that are kicked up by a vehicle wheel and introduced into the inside of the AC generator.

JP-U-56-17856 discloses a rotary electric machine in which on a side of a copper wire has a round surface while other three sides of the wire have flat surfaces. However, it is practically difficult to provide this type of copper wire in view of manufacturing processes and costs. For example, it is necessary to place the round-surface-side in a fixed position.

SUMMARY OF THE INVENTION

Therefore, the present invention has been made in view of the above problems.

It is an object of the invention to provide an improved vehicle rotary electric machine that is equipped with a flat wire having insulation coating that is not damaged by foreign particles.

According to features of the invention, a stator winding is accommodated at a plurality of slots in a plurality of radially extending layers. The stator winding is comprised of a plurality of U-shaped conductor segments having a pair of straight portions disposed in the slots in the layers and a turn joint portion forming coil ends. Those of the straight portions disposed in one of opposite ends of layers have outside corners whose radius is larger than corners of others of the straight portions.

Therefore, the insulation coating can cover the corners evenly and can protect the stator winding from foreign particles or the like effectively. Preferably, the plurality of U-shaped conductor segments comprises large size U-shaped conductor segment group and small size U-shaped conductor segment group. The pair of straight portions of the large size U-shaped conductor segment group is disposed in the opposite radial end layers.

Therefore, only the large size U-shaped conductor segment group of the U-shaped conductor segments has to have outside corners in each slot that correspond to the corners of the slot. Accordingly, it is easy to provide such outside corners. It is also easy to identify the large size U-shaped conductor segment from other segments by the size thereof, thereby preventing errors in the manufacturing process. Since it is not necessary to increase the radius of the corners of the U-shaped conductor segments other than the large size U-shaped conductor segment group, the ratio of the cross-section of the straight portions relative to the space of the slot can be maximized.

According to another feature of the invention, a cooling fan disposed at an end of said rotor. Preferably, a pair of cooling fan may be disposed at opposite ends of the rotor.

Therefore, cooling air driven by the cooling fan can flow around the coil ends smoothly, and the stator winding 23 can be cooled more effectively and fan noises can be reduced.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 4 is a fragmentary cross-sectional plan view of a variation of the stator of the vehicle AC generator shown in FIG. 1;

FIG. 5A is a fragmentary perspective view of the stator shown in FIG. 2;

FIG. 5B is a cross-sectional view of a portion of the stator winding around coil ends;

DETAILED DESCRIPTION OF THE PREFERRED EMBODIMENTS

A vehicle AC generator according to a preferred embodiment of the invention is described with reference to the appended drawings.

Figure 1:
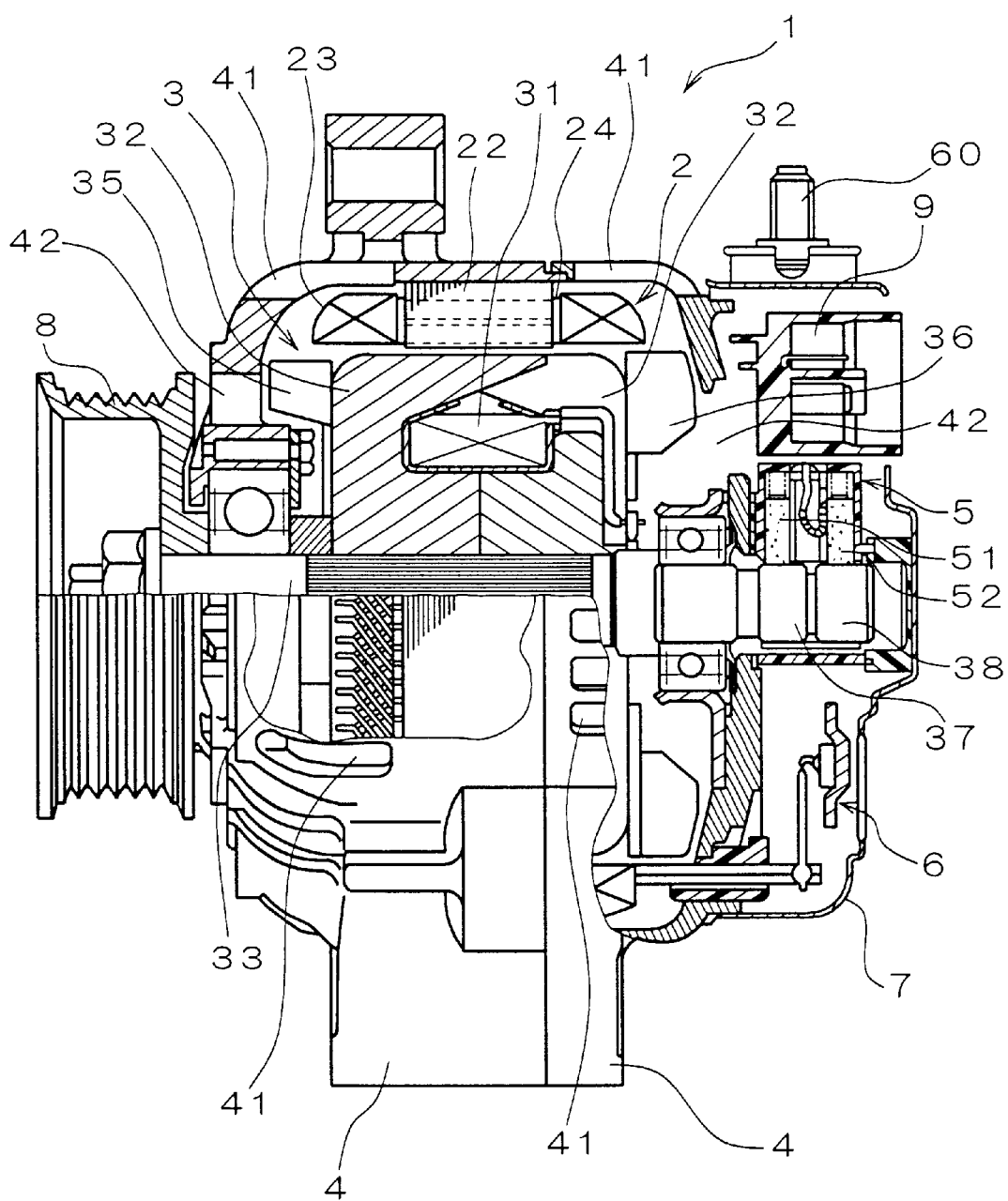
FIG. 1 is a cross-sectional side view of a vehicle AC generator according to a preferred embodiment of the invention.

As shown in FIG. 1, the vehicle AC generator 1 according to the preferred embodiment is comprised of a stator 2, a rotor 3, a frame 4, a brush unit 5, a rectifier unit 6, a rear cover 7, etc.

The stator 2 is comprised of a stator core 22 having a plurality of slots 25, a stator winding 23 accommodated in the slots 25 and a plurality of insulators 24 insulating the stator winding 23.

The rotor 3 is comprised of a cylindrical field coil 31, a pair of front and rear pole cores 32 having six claw poles that sandwiches and encloses the field coil 31 and a rotary shaft 33 penetrating the pair of pole cores 32. A mixed-flow-type cooling fan 35 is welded to the front end of the front pole core 35, and a centrifugal cooling fan 36 is welded to the rear end of the rear pole core 35. A pair of slip rings 37 and 38 is fixed to a rear portion of the rotary shaft 33 and electrically connected to the field coil 31.

The frame 4 accommodates the stator 2 and the rotor 3 and supports the rotor 3 so as to rotate on the rotary shaft 3. The frame 4 supports the stator 2 around the rotor 3 so that the inner periphery of the stator 2 faces the outer periphery of the pole core 32 of the rotor 3 at a suitable gap. The frame 4 has a number of air discharge windows 41 at portions thereof opposite the stator winding 23 and some air intake windows 42 at axially opposite end portions thereof.

The brush unit 5 has a pair of brushes 51 and 52 that contacts the pair of slip rings 37 and 38 under pressure to supply the field coil 31 with field current from the rectifier unit 6, which rectifies three-phase AC power generated at the stator winding 23 to provide DC power. The rear cover 7 covers and protects the brush unit 5, the rectifier unit 6, an IC regulator 9, etc., which are fixed to rear surface of the rear frame 4.

When the vehicle AC generator 1 is rotated by an engine via a belt and a pulley 8 and if field current is supplied to the field coil 31 to polarize the claw poles of the pole cores 32, the stator winding 23 induces three-phase AC voltage. Accordingly, the rectifier unit 6 provides DC voltage at an output terminal 60 thereof.

Figure 2:
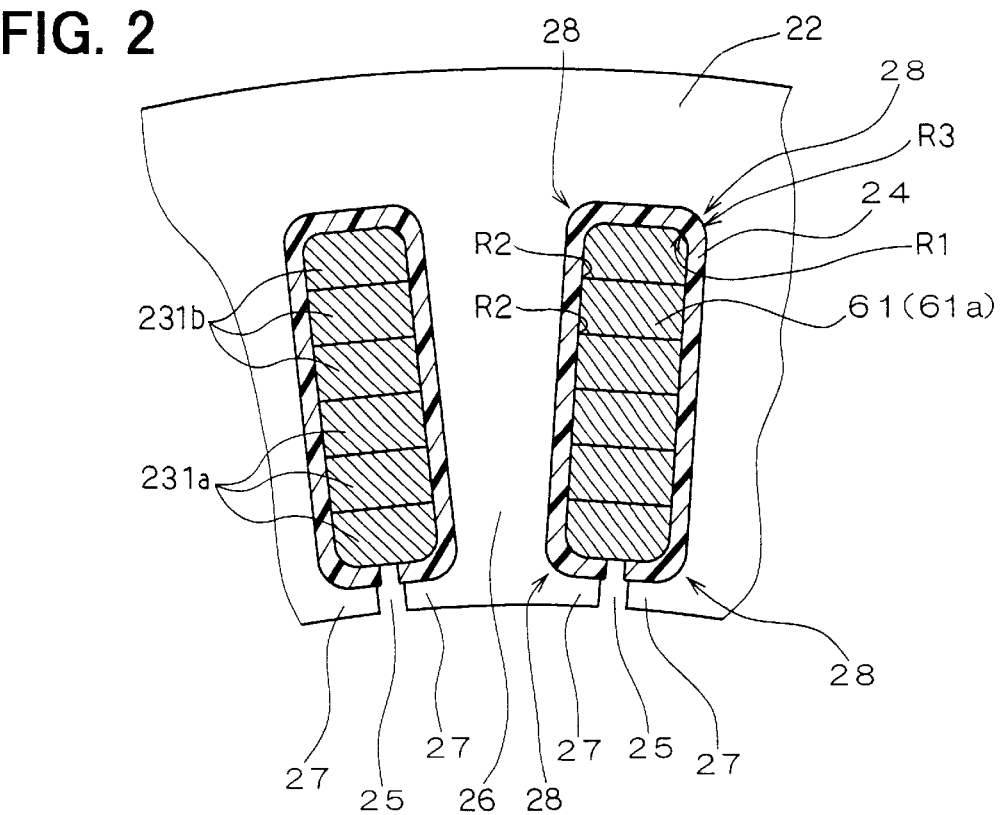
FIG. 2 is a fragmentary cross-sectional plan view of a stator of the vehicle AC generator shown in FIG. 1.

The stator core 22 is a laminate of thin steel sheets. As shown in FIG. 2, a plurality of slots 25 and teeth 26 are press-formed in each steel sheet. Each tooth has a pair of tooth edges 27 that effectively collects magnetic flux. Each slot 25 is generally rectangular and has four corners. The radius of the corners should not be too small in order to maintain the lifetime of press dies for a suitable period.

Figure 3:
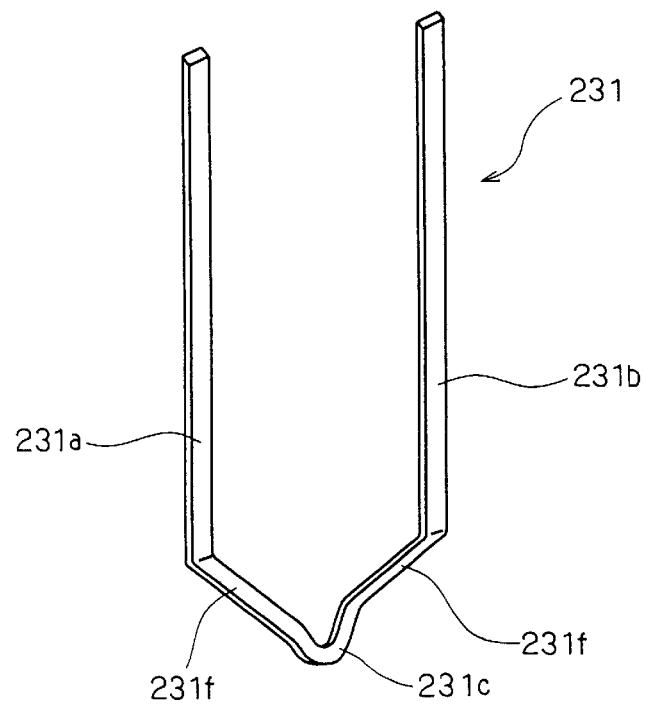
FIG. 3 is a perspective view of a conductor segment that is a portion of a stator winding of the vehicle AC generator shown in FIG. 1.

The stator winding 23 is comprised of a plurality of U-shaped conductor segments 231, as shown in FIG. 3. Each U-shaped conductor segment has a pair of straight portions 231a and 231b, a turn portion 231c and a pair of inclined portion 231f. The turn portion 231c that connect s the pair of straight portions 231a and 231b via the pair of inclined portions 231f is formed at the middle of the conductor segment 231.

Six straight portions 231a and 231b of six different U-shaped conductor segments 231 are bundled and formed into a line and inserted in each of the slots 25 with an insulator 24, as shown in FIG. 2. In other words, six straight portions are disposed in six layers extending in the radial direction of the stator core 22 in the following manner.

The straight portions 231a and 231b of each U-shaped conductor segment 231 are respectively inserted into different slots 25 that are a pole-pitch spaced apart from each other. For example, the one straight portion 231a of a large size U-shaped conductor segment 231 is inserted into one of the slots 25 at the first or innermost layer, and the other straight portion 231b of the same large size U-shaped conductor segment 231 is inserted into another slot at the sixth or outermost layer. The one straight portion 231a of a middle size U-shaped conductor segment 231 is inserted into one of the slots 25 at the second (or the second layer from the innermost) layer, and the other straight portion 231b of the same middle size U-shaped conductor segment is inserted into another slot at the fifth (or the second layer from the outermost) layer. Further, the straight portion 231a of a small size U-shaped conductor segment 231 is inserted into one of the slots 25 at the third (or the third layer from the innermost) layer, and the straight portion 231b of the same small size U-shaped conductor segment is inserted into another slot at the fourth (or the third layer from the outermost) layer. Thus, the stator winding 23 is formed of three types of U-shaped conductor segments 231—large, middle and small size U-shaped conductor segments. The large size U-shaped conductor segments have a pair of straight portions 231a and 231b disposed opposite ends of the layers of the six straight portions disposed in each slot 25.

Thereafter, the straight portions 231a and 231b that extend from a certain slot 25 are bent in opposite directions at a portion remote from the turn portion 231c so that the opposite ends are respectively connected to ends of the straight portions 231a and 231b of other U-shaped conductor segments 231 that extend from other slots 25 that are a pole-pitch spaced apart from the certain slot 25. Thus, the plurality of conductor segments 231 are connected to form one of three phase-windings that are shifted 120 degree in electric angle from each other to form the stator winding 23.

The large size U-shaped conductor segment 231 has outside corners whose radius R1 is larger than the radius R2 of the other or inside corners of the same large size U-shaped conductor segment and all corners of other conductor segments 231. The radius R1 of the outside corners of the large size U-shaped conductor segment 231 is about the same as the radius R3 of the corners of the slot 25 which the outside corners of the large size U-shaped conductor segments respectively face.

Figure 6:
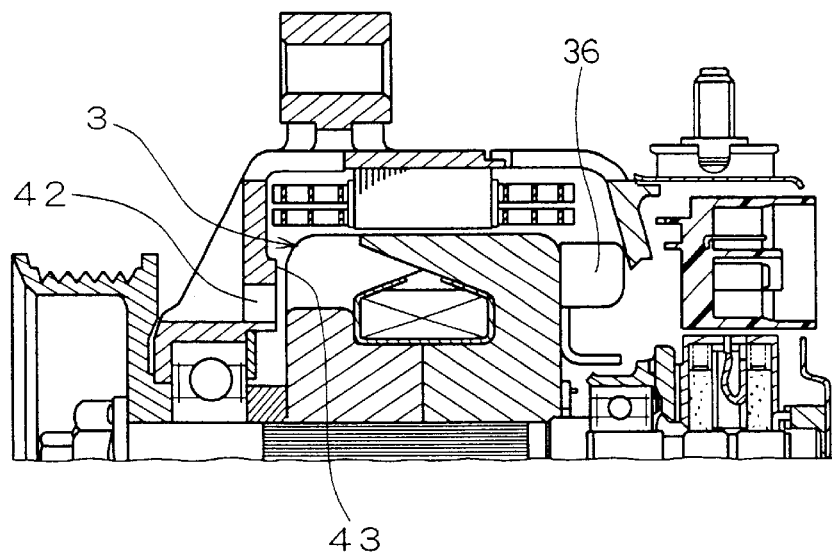
FIG. 6 is a fragmentary cross-sectional side view of a variation of the vehicle AC generator shown in FIG. 1.

As shown in FIG. 4, four straight portions 231a or 231b of four U-shaped conductor segments 231 may be formed into a line and inserted in each of the slots 25 with an insulator 24 to form four layers extending in the radial direction of the stator core 22. The cross-section of the straight portions 231a and 231b is generally rectangular and has radial sides longer than circumferential sides. Therefore, the straight portion shown in FIG. 4 provides broader surfaces of the conductor segments 231 in contact with the surface of the slot 25 than the straight portions that have a cross-section whose radial sides are shorter than the circumferential sides of the same, as shown in FIG. 2. In addition, this structure can provide more spaces for cooling air between the conductor segments in the circumferential direction, as shown in FIGS. 5A and 5B. Thus, this arrangement is effective to cool the stator winding 23. Accordingly, it is possible to omit one of the cooling fans 35 and 36, so that one of the gaps between the frame 4 and the rotor 3 can be made small, as shown in FIG. 6.

Figure 7:
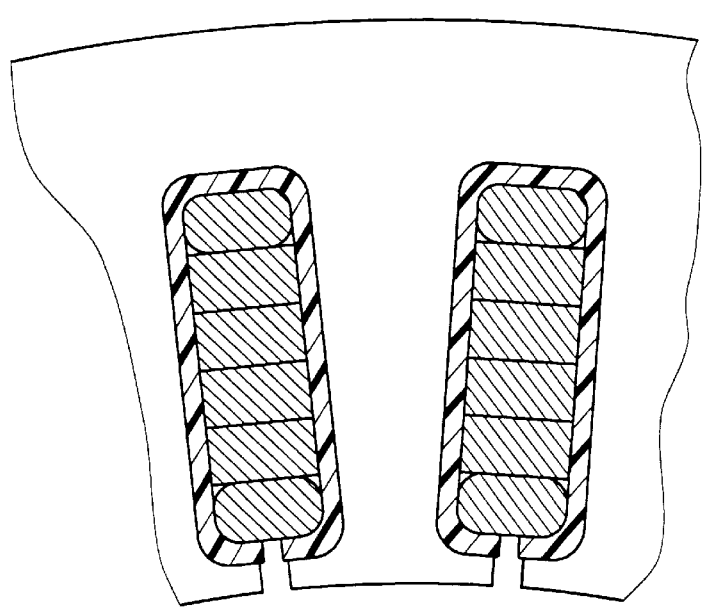
FIG. 7 is a fragmentary cross-sectional plan view of a variation of the stator shown in FIG. 2.

It is also possible to form the large size U-shaped conductor segment with round corners at not only the outside corner but also on the inside corner, as shown in FIG. 7. This makes manufacturing of the large size U-shaped conductor segments easier, because it is not necessary to check the corners.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle rotary electric machine including a rotor, a stator having a stator core and a stator winding and a frame for supporting said rotor and stator, wherein said stator core has a plurality of slots;

said stator winding comprises a plurality of U-shaped conductor segments, having a generally rectangular cross-section with four corners and a pair of straight portions, disposed in a pair of said slots spaced apart at a fixed pitch so that a bundle of said straight portions forms radially extending layers in each of said slots and a turn joint portion disposed at an end of said stator core to form a coil end; and each of said straight portions of said U-shaped conductor segments forming radially opposite ends of said bundle has outside corners having a radius and the other corners of the bundle of said straight portions do not have a radius.

2. The vehicle rotary electric machine as claimed in claim 1, wherein said plurality of U-shaped conductor segments comprises a large size group whose pair of straight portions is disposed in said opposite radial end layers and a small size group whose pair of straight portions is disposed other than said opposite radial end layers.

3. The vehicle rotary electric machine as claimed in claim 2, further comprising a cooling fan disposed at an end of said rotor.

4. The vehicle rotary electric machine as claimed in claim 2, further comprising a pair of cooling fans disposed at opposite ends of said rotor.

5. The vehicle rotary electric machine as claimed in claim 3, wherein the other end of said rotor is disposed near said frame.

6. The vehicle rotary electric machine as claimed in claim 1, wherein said straight portions are disposed in a line in said slots so that each of said straight portions contact inner surface of said slots.

7. The vehicle rotary electric machine as claimed in claim 1, wherein each of said slots accommodates said straight portions in a line.

8. The vehicle rotary electric machine as claimed in claim 2, wherein said large size group of said straight portions has a smaller cross-section than said small size group of said straight portions.

9. A vehicle rotary electric machine including a rotor, a stator having a stator core and a stator winding and a frame supporting said rotor and stator, wherein said stator core has a plurality of slots for accommodating said stator windings in a plurality of radial layers;

said stator winding comprises a plurality of U-shaped conductor segments having a generally rectangular cross-section and a straight portion disposed in said slots in said radial layers; and each of said straight portions disposed in one of opposite radial ends of said layers has outside corners having a radius and the corners of others of said straight portions do not have a radius.

10. The vehicle rotary electric machine as claimed in claim 9, further comprising a cooling fan disposed at an end of said rotor.

11. The vehicle rotary electric machine as claimed in claim 10, wherein one group of said straight portions disposed in one of opposite radial ends of said layers has a smaller cross-section than a cross-section of others of said straight portions.

12. A vehicle rotary electric machine, comprising:

a frame;

a rotor supported by said frame; and a stator supported by said frame and having a stator core and a stator winding, said stator core including a plurality of slots having generally parallel inner walls and corners, said stator winding including a plurality of U-shaped conductor segments having a pair of straight portions disposed in a pair of said slots spaced apart at a fixed pitch so that a bundle of said straight portions forms a radially extending line disposed in a plurality of layers in each of said slots and a turn joint portion disposed at an end of said stator core to form a coil end, wherein each of said U-shaped conductor segments has a generally rectangular cross section and a width to fit said slots, and each of said straight portions disposed at radially opposite ends of said layers has corners having a radius and the corners of others of said straight portions do not have a radius.

13. A vehicle rotary electric machine, comprising:

a frame;

a rotor supported by said frame; and a stator supported by said frame and having a stator core and a stator winding, said stator core including a plurality of slots having generally parallel inner walls and corners, said stator winding including a plurality of U-shaped conductor segments having a pair of straight portions disposed in a pair of said slots spaced apart at a fixed pitch so that a bundle of said straight portions forms a radially extending line disposed in a plurality of layers in each of said slots and a turn joint portion disposed at an end of said stator core to form a coil end, each of said U-shaped conductor segments having a generally rectangular cross section and width to fit said slots; wherein said plurality of U-shaped conductor segments comprises large size U-shaped conductor segments and small size U-shaped conductor segments, and each of said large size U-shaped conductor segments has said pair of straight portions disposed at radially opposite ends of said layers that have corners whose radius is larger than corners of others of said small size U-shaped conductor segments.

14. A vehicle rotary electric machine including a stator and a rotor, said stator comprising:

a stator core including a plurality of slots having generally parallel inner walls and corners; and a stator winding including a plurality of U-shaped conductor segments having a pair of straight portions disposed in a pair of said slots spaced apart at a fixed pitch so that a bundle of said straight portions forms a radially extending line disposed in a plurality of layers in each of said slots, each of said U-shaped conductor segments having a generally rectangular cross section and a width to fit said slots; wherein said plurality of U-shaped conductor segments comprises large size U-shaped conductor segments and small size U-shaped conductor segments, and each of said large size U-shaped conductor segments has said pair of straight portions disposed at radially opposite ends of said layers that have corners whose radius is larger than corners of others of said small size U-shaped conductor segments.

15. The vehicle rotary electric machine as claimed in claim 2, wherein said large size group of said U-shaped conductor segments has outside corners whose radius is larger than other corners at portions other than said straight portions.

16. The vehicle rotary electric machine as claimed in claim 9, wherein said plurality of U-shaped conductor segments comprises a large size group whose pair of straight portions is disposed in said opposite radial end layers and a small size group whose pair of straight portions is disposed other than said opposite radial end layers; and said large size group of said U-shaped conductor segments has outside corners whose radius is larger than other corners at portions other than said straight portions.

17. The vehicle rotary electric machine as claimed in claim 12, wherein said plurality of U-shaped conductor segments comprise a large size group whose pair of straight portions is disposed in said opposite radial end layers and a small size group whose pair of straight portions is disposed other than said opposite radial end layers; and said large size group of said U-shaped conductor segments has outside corners whose radius is larger than other corners at portions other than said straight portions.

18. The vehicle rotary electric machine as claimed in claim 13, wherein each of said large size U-shaped conductor segments has outside corners whose radius is larger than corners of others at portions other than said straight portions.

19. The vehicle rotary electric machine as claimed in claim 14, wherein each of said large size U-shaped conductor segments has outside corners whose radius is larger than corners of others at portions other than said straight portions.

20. A vehicle rotary electric machine including a rotor, a stator having a stator core and a stator winding and a frame supporting said rotor and stator, wherein said stator core has a plurality of slots for accommodating said stator windings in a plurality of radial layers;

said stator winding comprises a plurality of U-shaped conductor segments having a generally rectangular cross-section and a straight portion disposed in said slots in said radial layers; and each of said straight portions disposed in opposite ends of said layers has corners having a radius, and outside corners of said straight portions have a radius larger than a radius of inside corners of said straight portions and the corners of others of said straight portions do not have a radius.

* * * * *